June 1, 1937.   J. LAWSON ET AL   2,082,751
MECHANISM AND PROCESS FOR EFFECTING REVERSE PLATING
Filed March 3, 1927    2 Sheets-Sheet 1

Inventors:
John Lawson,
Robert H. Lawson,

Fig. 2. 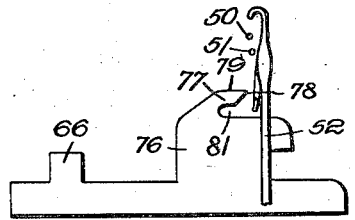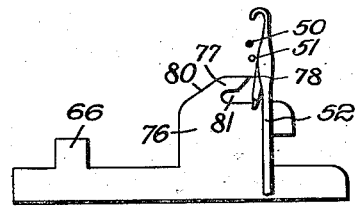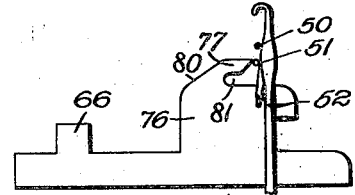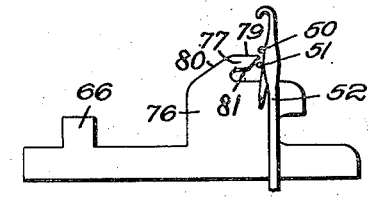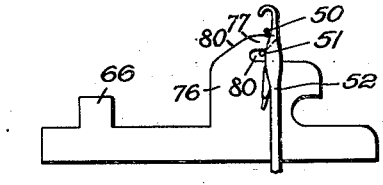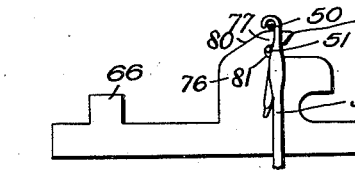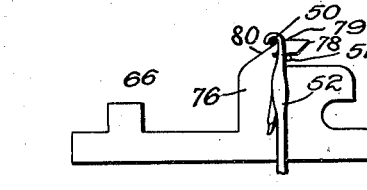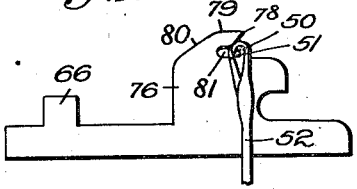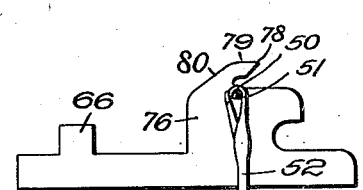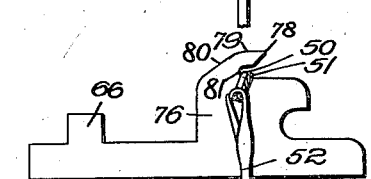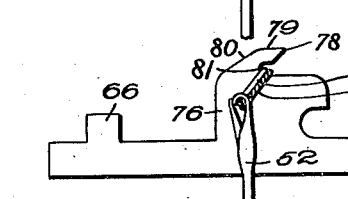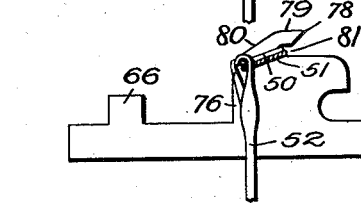
Fig. 3. 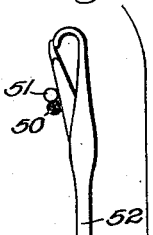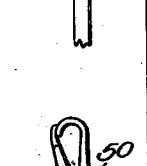

Patented June 1, 1937

2,082,751

UNITED STATES PATENT OFFICE 2,082,751

MECHANISM AND PROCESS FOR EFFECTING REVERSE PLATING

John Lawson and Robert H. Lawson, Pawtucket, R. I., assignors to Hemphill Company, Central Falls, R. I., a corporation of Massachusetts Application March 3, 1927, Serial No. 172,331

14 Claims. (Cl. 66—108)

This invention relates to mechanism and process for knitting plated fabric and for effecting a change or reversal in the plated relations of threads or yarns in some of the stitches.

In order that the principle of the invention may be readily understood, we have disclosed embodiments of the mechanism and instrumentalities whereby the invention may be practised, and the method thereof carried out.

In the drawings:

Fig. 2 shows successive positions of the knitting instrumentalities while they are acting upon the yarns to effect the knitting of plated fabric;

Fig. 3 shows successive positions of previously drawn loops, indicating the relative positions of two yarns as the loops are being cast off a needle.

In the U. S. Patent to Robert H. Lawson, No. 1,605,895, dated November 2, 1926, there are disclosed means for effecting reverse plating by the action of casting off mechanism, whereby lengthwise extending stripes may be formed in hosiery or other knitted fabrics. In the U. S. Patent to Robert H. Lawson, No. 1,605,896, dated November 2, 1926, there is disclosed means for effecting reverse plating through the action of casting off mechanism, the transverse movements whereof are selectively governed, whereby a great variety of patterns may be provided. In the present application means are disclosed constituting improvements upon the mechanisms shown in both of said patents. The mechanism shown is particularly adapted for use in connection with any form of means selectively governing the transverse movements of instrumentalities moving transversely of the needles in effecting a change in the plating relation of the yarns.

Although the terms "plain plated" and "reverse plated" are merely relative, for convenience in the following description the plain plated areas will be referred to as the ones where the yarn 50 is on the inside of the fabric.

When in the knitting of plated fabric the plating yarn or the one appearing on the outer face of the fabric is determined by yarn tension, the one of two yarns under the greater tension will appear on the outer face of the fabric unless some provision is made for reversing the positions of the yarns in the hooks of the needles. As herein disclosed, however, although the tension or the greater tension is placed upon the yarn 50 the said yarn appears on the inner face of the fabric during normal plating, this being effected by causing the nibs of the sinkers to enter between and separate the yarns thus preventing the tension or excess tension imposed on the yarn 50 from determining the relative positions of the yarns 50 and 51 in the fabric.

Figure 1:
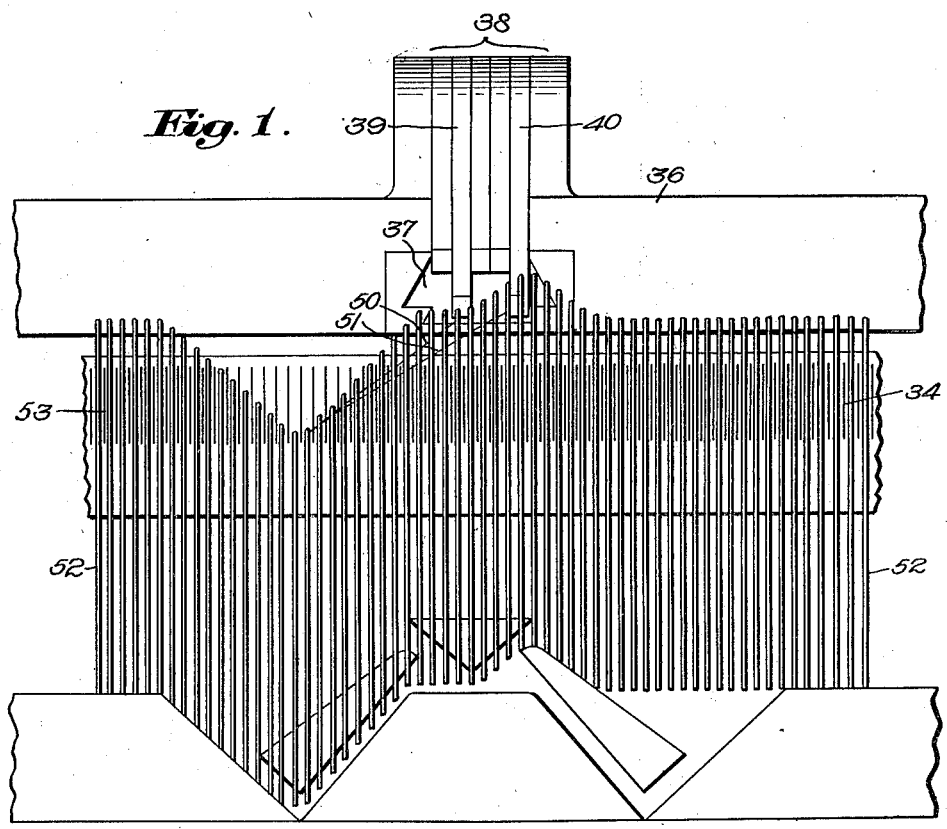
Fig. 1 is an inside elevation at the knitting cams and representing the feeding of the two yarns or threads to the needles in a plating relation.
Figure 4:
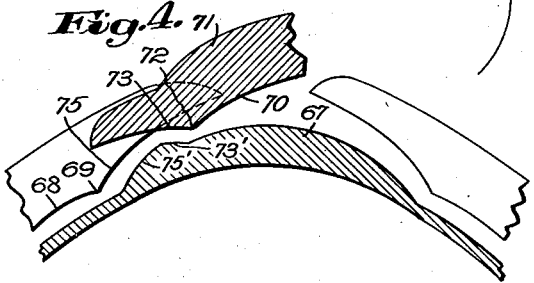
Fig. 4 is a detail representing the special and regular cams adapted to act upon the special instrumentalities such as sinkers or web holders in moving the same inward and outward.

In Fig. 1, latch ring 36 is shown as having any suitable form of mouthpiece 37, upstanding ears 38 being provided on the mouthpiece between which yarn levers, such as 39 and 40, are pivoted to move to and from feeding position as usual in machines of the type disclosed herein.

The thread or yarn 50 may be fed to the needles through the yarn lever 39 while the thread or yarn 51 may be fed to the needles through the yarn lever 40. When the threads or yarns 50, 51 are fed to the needles in a plating relation the needles 52 successively knit stitches in conjunction with interspersed sinkers or other instrumentalities 53.

Some of the sinkers or instrumentalities 53 are specially constructed being designated by numeral 76 and having relatively long butts 66, the butts of all the instrumentalities moving along a cam path defined on one side by a fixed cam 67, the sinkers not provided with special butts 66 being advanced at the normal time by a cam 68, the point 69 whereof causes the sinkers to advance to the so-called knock-over point. The butts 66, however, are engaged earlier in the knitting cycle by the forward edge or surface 70 of a cam 71, the cam surface 70 at 72 being at a relatively forward position, i. e., with respect to the axis of the needle cylinder, to cause the special sinkers to advance in the manner hereinafter to be described. After having engaged the butts 66 and advanced their instrumentalities the forward face 70 of the cam 71 recedes as at 73 thereby permitting the sinkers to be retracted by a correspondingly shaped portion of the cam 67 as indicated at 73'. After the butts 66 have been retracted by the cam 73', the regular sinker advancing cam 68 engages the butts 66 advancing them as well as the regular sinkers or web holders, the cam 67 being correspondingly shaped as at 75' to permit the forward movements of the butts.

One form of special instrumentality 76 having a butt 66 is shown in Fig. 2 wherein the upper nib 77 is provided with a sharp nose 78, which when a special instrumentality 76 is advanced at an abnormally early point in the knitting cycle as by a cam 72, enters between the body and plating yarns thereby separating the same momentarily while the stitches are being drawn and ensuring a change in the plating relation of the two threads (as compared with the plating relation of the threads knitted as shown in the last five positions of Fig. 2) by preventing the upper thread being displaced in the hook of an adjacent needle by the tension thereon. As shown in Fig. 1, the threads 50, 51 are fed to the needles at an angle to the horizontal and sufficiently separated to permit the nibs to enter therebetween.

In Fig. 2 we have shown twelve positions of a needle and special instrumentality 76, being the positions or most of the positions that would occur during the inward movement of the special instrumentalities along the edge 70, their ensuing outward movement along the edges 73, 73', and then their inward movement along the edge 75 of the regular cam 68 and the cooperating edge 75' of the cam 67. The effect of the sharp nose 78 entering between the two yarns 50, 51 is to cause the upper yarn 50, which preferably is the tensioned or more tensioned yarn, to ride upon the upper edge 79 of the special instrumentality 76 and then down or along the sloping edge 80. The advanced sinker nib on nose 78 remains in a position between the two yarns until the companion needle has moved to such a position as to prevent the tensioned yarn displacing the other yarn in the hook of the needle. Subsequent retraction of the sinker, as by the incline 73' of cam 67, causes the yarns to be positioned forwardly of the sinker nib or nose 78. The white yarn 51, however, being the yarn which has the less tension or is without tension, is separated by the nose 78 from the upper yarn 50 and enters into the notch or recess 81, as shown in the several positions beginning with the fourth position in Fig. 2.

Although, by way of example, tensioning one yarn more than another has been described as being one way of effecting plating, it is to be understood that there are other ways of determining which of two yarns shall be the plating yarn, for example, such as separating or positioning the two yarns to ensure one yarn, commonly known as the plating yarn, appearing on the outer surface of the fabric. Furthermore, the entry of a portion of a sinker or other instrumentality between the two yarns for the purpose of maintaining the yarns separated in the manner hereinbefore described, may be utilized to prevent the mentioned separating or positioning of the yarns acting to ensure a certain plating relation at some of the wales, in the same manner as when the plating is effected by tensioning one yarn more than another.

In the foregoing description and claims, a "plating relation" may refer to any relative position of two threads or yarns, i. e., whether they are in a plain plated or reversely plated relation.

It will be noted that the nibs 77 when the sinkers 76 are specially actuated as shown in the first seven positions of Fig. 2, enter between the yarns 50, 51 and prevent the tensioned yarn 50 moving to such a position within the hook of the descending needle as to cause the said yarn 50 to appear on the outer face of the fabric.

Having thus described certain illustrative embodiments of the invention and the process by which the same is carried out, it is to be understood that although specific terms are employed, they are used in a generic and descriptive sense and not for purposes of limitation, the scope of the invention being set forth in the following claims.

We claim:

1. Mechanism for effecting plating and reverse plating in a knitted fabric including a series of independent needles, thread engaging instrumentalities for each needle respectively including regular web holders, and including special instrumentalities by which reverse plating is to be effected, all of said instrumentalities being movable individually transverse of the needle series, thread guiding means to feed a back thread and a face thread in a plating relation to the needles, each of said special instrumentalities having an upper nib, the outer edge whereof is downwardly sloping and is adapted to receive one only of said threads during loop formation and for the purpose of effecting a change in the reverse plating.

2. Mechanism for effecting plating and reverse plating in a knitted fabric including a series of independent needles, thread engaging instrumentalities for each needle respectively including regular web holders, and including special instrumentalities where reverse plating is to be formed, all of said instrumentalities being movable individually transversely of the needle series, thread guiding means to feed a back thread and a face thread in a plating relation to the needles, each of said special instrumentalities having an upper nib, the outer edge whereof is downwardly sloping and is adapted to receive one only of said threads during loop formation and for the purpose of effecting a change in the plating, and means governing the transverse movement of said special instrumentalities to cause them to move inward at an earlier point circumferentially considered than do the regular web holders.

3. An instrumentality adapted for use in reverse plating and slidable in a groove extending transversely of and between two adjacent needles, said instrumentality having an upper nib provided with a sharp nose to enter between two yarns, and a notch or recess directly under the nib, said instrumentality having a downwardly, outwardly inclined edge extending from the top or back portion of said nib and adapted in reverse plating to receive one of the threads during the loop forming operation and cooperating with the needle in effecting a change in the plating.

4. That process of effecting striped plating on knitted fabrics consisting in feeding a back thread and a face thread to the needles so as to effect a plating of the threads, moving certain thread engaging instrumentalities transversely of the needle series at an abnormally early point in the loop forming operation so as to effect thread engagement in such a manner as to cause a relative change in the positions of the threads, whereby when thread formation is completed, plating is produced at the wales pertaining to the said certain thread engaging instrumentalities and a change in the plating is produced at the other wales, and whereby an accidental change in the plating at the wales pertaining to the said certain thread engaging instrumentalities is prevented by effecting momentary separation of the two threads and maintaining said separation while the stitches are being drawn.

5. That process of effecting striped plating on knitted fabrics consisting in feeding a back thread and a face thread to the needles so as to effect a plating of the threads, moving certain thread engaging instrumentalities transversely of the needle series at an abnormally early point in the loop forming operation so as to effect thread engagement in such a manner as to cause a relative change in the positions of the threads, whereby when thread formation is completed, plating is produced at the wales pertaining to the said certain thread engaging instrumentalities and a change in the plating is produced at the other wales, and whereby an accidental change in the plating at the wales pertaining to the said certain thread engaging instrumentalities is prevented by causing the nibs of the sinkers to enter between and thereby effect a separation of the two threads and maintaining said separation while the stitches are being drawn.

6. In an independent needle knitting machine, needles and cooperating instrumentalities, some, at least, of said instrumentalities being constructed to separate two threads fed to the needles in a plating relation and to hold them separated while the stitches are being drawn, and means for knitting the two threads in a plating relation at some of the wales and in a changed plating relation at the wales pertaining to the specially constructed instrumentalities.

7. In an independent needle knitting machine, needles and cooperating instrumentalities, each of some, at least, of said instrumentalities having an edge over which two yarns fed to the needles are drawn by the said needles and in a plating relation, means for actuating some of the instrumentalities to effect a temporary separation of the threads and while the threads are thus separated to effect the knitting of stitches in which the threads are in a changed plating relation as compared with the stitches knitted when the said yarns are drawn by the needles over the mentioned edges of the instrumentalities.

8. A knitting machine of the circular, independent needle type having mounted therein needles and sinkers for independent movements, nibs carried by the sinkers, means for feeding at least two threads to the needles and in separated relation, and means for advancing some of the sinkers so that the sinker nibs pass between the separated threads and hold them separated while the stitches are being drawn and for advancing others of the sinkers so that the nibs of the sinkers last named do not pass between the separated threads.

9. A knitting machine of the independent needle type having mounted therein needles and sinkers for independent movements, nibs carried by the sinkers, means for feeding at least two threads to the needles and in separated relation, and means for advancing some of the sinkers so that the sinker nibs pass between the separated threads and hold them separated while the stitches are being drawn and for advancing others of the sinkers so that the nibs of the sinkers last named do not pass between the separated threads.

10. A knitting machine of the independent needle type having needles and sinkers mounted therein for independent stitch forming movements, the sinkers having upper edges over which both threads may be drawn by the descending needles, a sinker nib projecting from the said upper edge of each sinker, and means for timing and controlling the advancing movements of the sinkers in such a manner as to cause certain ones of the sinker nibs to enter between the body and plating threads to maintain the said threads separated while the stitches are being drawn and others of the sinkers to be positioned to permit the descending needles to draw the body and plating threads over edges of the sinkers for the purpose of effecting the knitting of plated stitches contrasting with the stitches knitted when the sinkers enter between the body and plating threads.

11. A knitting machine having needles and sinkers or web holders independently mounted therein, said web holders having edges over which a thread is adapted to be drawn and having nibs, means for feeding at least two threads to the needles while knitting certain of the courses and in plating relation, the said threads being fed to the needles in separated relation to permit the nibs of the web holders to pass between them, and means for advancing some of the web holders at such a time in the knitting cycle as to cause the nibs of the web holders to pass between the two threads and hold them separated while the stitches are being drawn.

12. In an independent needle knitting machine, needles and cooperating instrumentalities, some, at least, of said instrumentalities being constructed to maintain separated two threads fed to the needles in a vertically spaced relation, and means for knitting the two threads in a plating relation at some of the wales and in a changed plating relation at the wales pertaining to the specially constructed instrumentalities while maintaining more tension on the upper one of the two threads than upon the other.

13. A method of knitting consisting in feeding two yarns to the needles and imposing a greater tension on one of the yarns than on the other and preventing the tensioned yarn from showing on the outer face of the fabric at some of the stitches by maintaining the threads in a separated relation until the needles have descended far enough to prevent reversal in the positions of the yarns thereafter and until subsequent retraction of knitting instrumentalities that are adjacent to and cooperate with the needles, and causing the tensioned yarn to show only on the outer face of the fabric at other stitches.

14. An independent needle knitting machine having needles and instrumentalities cooperating therewith in the formation of stitches, means for feeding two yarns to the needles in a plating relation, one of said yarns being under greater tension than the other, and means for causing portions of some instrumentalities to enter between the yarns and maintain them separated until the companion needles have moved to such a position as to prevent the tensioned yarn displacing the other yarn in the hooks of the needles and until subsequent retraction of said instrumentalities, in combination with means for controlling others of the said instrumentalities to effect, at selected wales, a reversal of the aforesaid plating relations of the yarns.

JOHN LAWSON.
ROBERT H. LAWSON.